United States Patent [19]

Roberts

[11] 4,327,338
[45] Apr. 27, 1982

[54] NUCLEAR ACTIVATED cw CHEMICAL LASER

[75] Inventor: Thomas G. Roberts, Huntsville, Ala.

[73] Assignee: The United States of America as represented by the Secretary of the Army, Washington, D.C.

[21] Appl. No.: 148,428

[22] Filed: May 9, 1980

[51] Int. Cl.³ .................... H01S 3/095; B01J 19/08
[52] U.S. Cl. ........................ 372/89; 204/157.1 H; 372/58
[58] Field of Search .............. 331/94.5 G, 94.5 P; 176/39; 250/432 R, 435, 436, 437, 438, 527; 204/157.1 H

[56] References Cited

U.S. PATENT DOCUMENTS

| | | | |
|---|---|---|---|
| 3,453,196 | 7/1969 | Sporek | 204/157.1 H |
| 3,832,650 | 8/1974 | Roberts | 331/94.5 P |
| 3,986,139 | 10/1976 | Meneely et al. | 331/94.5 P |
| 4,039,412 | 8/1977 | Hill | 204/157.1 H |
| 4,147,995 | 4/1979 | Lieby, Jr. | 331/94.5 PE |
| 4,233,126 | 11/1980 | Garcia | 204/157.1 H |

Primary Examiner—James W. Davie

Attorney, Agent, or Firm—Nathan Edelberg; Robert P. Gibson; Freddie M. Bush

[57] ABSTRACT

A cw chemical laser which uses processed radioactive waste to produce active atoms from a chemically inactive gas before being mixed with another molecule such as hydrogen or deuterium is disclosed. This laser uses no toxic or corrosive fuels and does not require any electrical or other type of auxiliary power supply. The energy released by the radioactive material is used to produce the active atoms such as fluorine. This is accomplished by using the radiation products from processed radioactive waste to dissociate the inert gas in the plenum of the laser. The radioactive material is held in the passageway walls of a device similar to a heat exchanger. The exchanger device may be located in the gas generator section of a chemical laser. The inactive gas is passed through the exchanger device and while passing through it the radiation from the radioactive material dissociates the gas, producing a concentration of free active atoms. This active atom generator then feeds the nozzle bank or mixing section of a laser to produce a lasing action.

9 Claims, 3 Drawing Figures

NUCLEAR ACTIVATED cw CHEMICAL LASER

DEDICATORY CLAUSE

The invention discribed herein may be manufactured, used, and licensed by or for the Government for governmental purposes without the payment to me of any royalties thereon.

BACKGROUND OF THE INVENTION

Current high power cw chemical lasers which use hypergolic gases require special equipment and special techniques for handling these highly reactive, corrosive, and toxic substances. In applications where these systems need to be portable, these substances are nearly prohibitive. For example, in the hydrogen fluorine (HF) chemical lasers gaseous $F_2$ is usually used. These hypergolic gas problems also plague the high power supersonic chemical transfer laser. However, these lasers have been operated where the electrons in an electric arc have been used to heat a gas such as nitrogen ($N_2$) and the hot $N_2$ is used to produce fluorine (F) atoms by thermally dissociating a gas such as sulfur-hexafluoride ($SF_6$) prior to mixing with hydrogen ($H_2$) or deuterium ($D_2$) to produce lasing by the reaction $F + D_2 \rightarrow DF^* + D$ where the $DF^*$ is produced in an excited vibrational state. While this approach solves the problem of using $F_2$, it introduces the need for an electric arc and its associated generator and control equipment which can be large and heavy in addition to not being very efficient in the application. Also, when $F_2$ is used it is first burned with a little $H_2$ in the plenum to heat the mixture to a temperature where some of the extra $F_2$ is thermally dissociated. This creates some HF which acts as a deactivator when the $D_2$ is mixed in to produce the lasing. When the electric arc is used heating the mixture is no problem, but with the arc the amount of diluent like $N_2$ is not easily varied for optimum laser operation.

High energy particles like electrons from the electrode space of flash X-ray machines have been used to operate high power chemical lasers in the pulsed mode by radiating mixtures such as $F_2/H_2/O_2, SF_6/H_2, F_2/D_2/O_2, SF_6/D_2$, and other mixtures. Neutron-sources like pulsed reactors have also been used to cause these mixtures to lase. High power chemical lasers can also be operated by introducing the proper mixtures into the cavity of conventional electron beam driven $CO_2$ laser devices. However, in each of these cases very large and elaborate auxiliary power supplies are necessary. In some cases very high voltages are required.

SUMMARY OF THE INVENTION

The nuclear activated chemical laser is a chemical laser or a chemical transfer laser in which the radiation from radioactive waste is used to produce the active atom concentration necessary for operation of the laser. These atoms are produced from an inactive, noncorrosive, nontoxic, nonhypergolic gas such as $SF_6$ passing through an active atom generator and no auxiliary power source is needed. Neither is an initiator or igniter needed; the laser action starts when the gas source valves are opened and stops when the source valves are closed. This is accomplished by using the radiation products such as $\alpha$, $\beta$, and $\gamma$ rays from processed radioactive waste to dissociate the $SF_6$ in the plenum of the laser. The radioactive material is held in the passageways of a housing device similar to a heat exchanger. This exchanger device is located in the gas generator section of a chemical laser such as a chemical trasfer laser. The $SF_6$ gas is passed through the exchanger device thereby allowing the radiation from the radioactive material to dissociate the $SF_6$, producing a concentration of free F atoms. This active atom generator may then feed the nozzle bank of a supersonic cw chemical laser or of a supersonic chemical transfer laser. It may also be used to feed the mixing section of either a subsonic chemical laser or a subsonic chemical transfer laser.

DESCRIPTION OF THE PREFERRED EMBODIMENT

Figure 1:
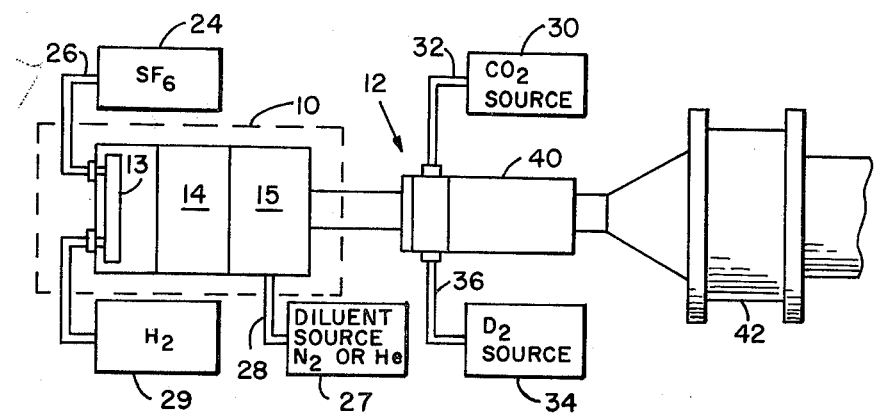
FIG. 1 is a diagrammatic illustration of a preferred embodiment of the active atom generator and laser device.

Referring to the drawings. In FIG. 1 the laser includes an active atom generating section 10 that provides a flow which contains a relatively large concentration of F atoms to a nozzle section 12 mounted downstream. The active atom generator 10 includes a dispersing section 13, a heat exchanger 14 or radiator having a set of passageways through which a chemically inactive gas is passed and an output chamber 15.

Exchanger or radiator 14 may be similar in function to an automobile or other type radiator for cooling an engine. A fluid or gas contained in the radiator housing may be stationary or moving and directs radiation through the housing walls where it affects the inactive gas passing through openings in the housing. Similarly, for processed solid radioactive waste disposed on the surfaces of the passageways through the housing, inactive gas passing through the radiator is affected by radiation from the waste. Typical embodiments of the exchanger 14 are shown in FIGS. 2 and 3.

Figure 2:
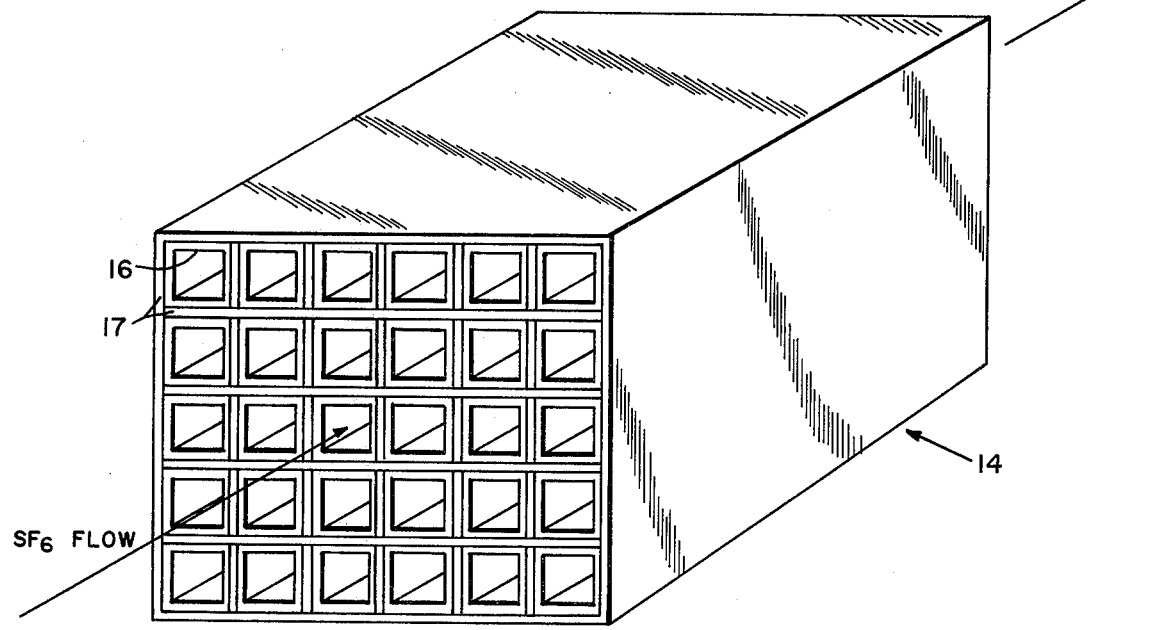
FIG. 2 is a perspective view of the exchanger device of the active atom generator section.

As shown in FIG. 2, a radioactive material may be in the form of a solid material 16 afixed to the walls 17 which form the passageways of the exchanger. The number, spacing, and shape of the passageways depend on the properties of the particular radioactive material used and on the pressure of the inactive gas which is to be passed through the passageways. The pressure also depends on the type of laser used, i.e., supersonic or subsonic, and on the details of the nozzle bank 12. The radioactive material 16, which eliminates the need for a power source or igniter, may be processed solid radioactive waste and processed waste which may be obtained from the evaporation of liquids afixed to surfaces of the passageways.

Figure 3:
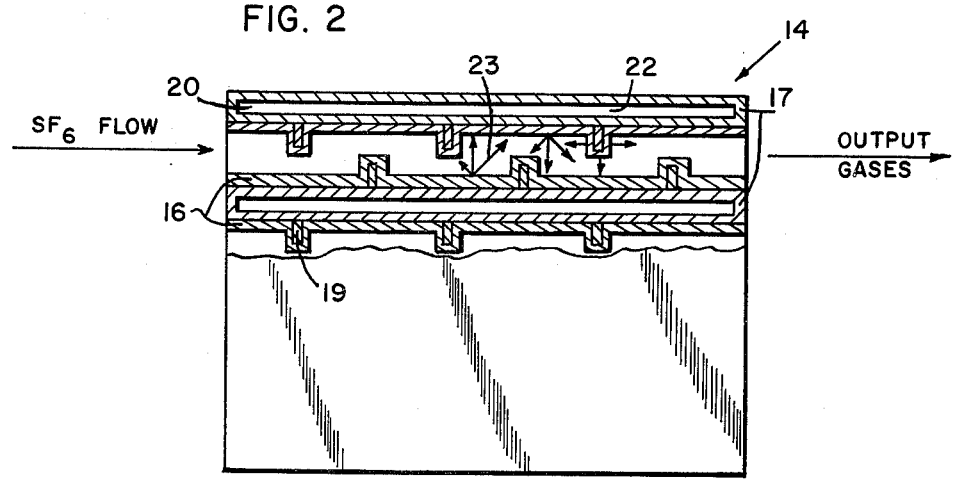
FIG. 3 is a cutaway view of an alternative exchanger device for the active atom generator section.

As shown in FIG. 3, in an alternative embodiment, exchanger or radiator 14 also include protrusions or fins 19 in the passageways for reducing flow and prolonging exposure to radiation. Instead of solid waste, a liquid or gaseous waste 20 is in chamber 22. The walls of chamber 22 also being the walls 17 of the passageways through the radiator. Liquid waste processed to enrich the $\beta$ and $\gamma$ radiations may be inclosed in chamber 22. Also it may be possible to dispense with the passages and simply mix a radioactive gaseous waste with the $SF_6$ in the gas generator. However, this can introduce too much contamination into the flow and reduce or eliminate the possibility of producing a population inversion by the desired chemical reaction.

The radioactive waste material is processed to eliminate the unwanted waste components and to concentrate the desired waste components which are then deposited on the surface walls or located as desired in gaseous or liquid form. As shown in FIG. 3 and typical also for FIG. 2 radioactive decay 23 is shown eminating from the walls for affecting the $SF_6$ gas.

While the inactive gas such as $SF_6$ is passing through the passageways the radiation from the radioactive material thereon dissociates the gas $SF_6$, thus producing the desired F atom concentration. As shown in FIG. 2, the passageways are arranged so that the gas passes straight through. However if the dwell time of the $SF_6$ within the passageways must be increased to prolong the effect of radiation on the $SF_6$, the passageways can be shaped to offer more resistance to the flow as shown typically in FIG. 3 where obstructions 19 slow the flow. In this application the $SF_6$ pressure may be quite high and the passage walls may be fairly close together. The average spacing between the walls is adjusted to be approximately the range of the dominate radiation in the $SF_6$. The amount of radioactive material used is proportional to the concentration of F atoms desired. Also in the event that it is necessary to raise the temperature of the gas by an additional amount a little $H_2$ or $D_2$ may be added to the flow just downstream of the passageways. For this case the passages and the radiation from the radiative material are simply used as an initiator and sustainer for a "conventional" chemical laser, except that now it is not necessary for the device to be supplied with a dangerous substance such as $F_2$. Therefore it is not necessary to transport or handle the dangerous gas, a substantial improvement for chemical lasers of this type. However, where practical it is better not to introduce $H_2$ or or $D_2$ upstream of the nozzle bank. In those lasers where this additive is not necessary the flow supplied to the nozzle bank contains no undesirable deactivators like HF or DF.

After the flow leaves the active atom generator, downstream processes are substantially the same as for prior art chemical transfer lasers. Typical of the structure and operation of such lasers is the "Supersonic Chemical Transfer Laser" of U.S. Pat. No. 3,832,650 issued Aug. 27, 1974 to Thomas G. Roberts. In the Background, U.S. Pat. No. 3,832,650 discusses existing subsonic and supersonic flow in chemical transfer lasers. Also discussed is the object of the invention, providing a laser in which the molecule to which energy is to be transferred is caused to be at a proper place during the proper time.

In the preferred embodiment of FIG. 1, active atom generator 10 has input dispersion section 13 coupled to receive and disperse the $SF_6$ gas received from a suitable source 24 via input conduit 26. The inactive gas $SF_6$ is dispersed and passed through radiator 14 providing a mixture output affected by radiation from the passageway walls of radiator 14. The output from the radiator may comprise a mixture of F, $F_2$, $SF_4$, SF and other gases. A diluent source 27 of $N_2$ or He may be coupled to the input side of radiator 14 (not shown) or to the output side of radiator 14 via conduit 28. The combination of $N_2$ or He with the $SF_6$ or output gases causes a decrease in the gas temperature and may be introduced if the gas temperature is above that required for mixture in nozzle 12. Similarly, $H_2$ from source 29 may be introduced into the generator to cause part of the fluorine to be burned and thereby release energy as heat to increase the gas temperature if needed. The gas mixture in the plenum chamber output 15 of generator 10 is thereby brought to a thermal equilibrium condition wherein a large concentration of fluorine atoms exist prior to expansion of the gas through nozzle section 12. Obviously, with adequate temperature control of the $SF_6$ and the radiator 14, there is no requirement for $H_2$, $N_2$, or He. A carbon dioxide ($CO_2$) source 30 is shown coupled through conduit 32 to nozzle 12 and a deuterium ($D_2$) source 34 is coupled through conduit 36 to nozzle 12. The fluorine from generator 10 is thoroughly mixed with the $CO_2$ in the nozzle before the $D_2$ is injected. When the $D_2$ is injected into and diffuses into the mixture, lasing of the $CO_2$ occurs in lasing chamber or optical cavity 40. The spent gases are then coupled to an exhaust system 42 for removal. For exo-atmospheric operation, exhaust system 42 is not required and may be omitted.

The particular operation and detail of nozzle 12 is well disclosed in the prior art teachings as evidenced in the nozzle section teachings of Patent Number 3,832,650, as well as teachings respecting various other chemical reaction transfers and the introduction of the respective chemicals to provide lasing action.

While a particular embodiment and form of this invention has been illustrated, it will be obvious to those skilled in the art that modifications may be made without departing from the scope and spirit of the foregoing disclosure. For example, cooling fins may be incorporated in radiator 14, water may be circulated within chambers of the radiator, or the $SF_6$ may itself be circulated in chambers 22. Similarly, for exo-atmospheric application appropriate pumps, valving, and standard fluid handling techniques are employed with all cryogenic fluid. Therefore, it is understood that the invention is limited only by the claims appended hereto.

I claim:

1. A chemical laser comprising: an active atom gas generator chamber having input, intermediate, and output sections for passing gas therethrough; an inactive gas source for supplying inactive gas to said generator input section; a nozzle section for expanding gases from said output section; means for supplying a lasing gas to the gas flow through said nozzle; a lasing chamber attached to the output of said nozzle, an exhaust system for exhausting gases passing through said lasing chamber; and said active gas generator chamber having gas dispersion means within the input section, said intermediate section being a radioactive energy exchanger having passageways therethrough to provide passage for gas into the output section and for affecting said inactive gas to provide an active atom gas output to said nozzle section.

2. A chemical laser as set forth in claim 1 wherein said energy exchanger is a radiator comprising a plurality of parallel metal passageways containing radioactive material for radiating energy into the passages of said passageways.

3. A chemical laser as set forth in claim 2 wherein said radiator passageways are solid metal passageways having processed solid radioactive waste material disposed on the surfaces thereof for providing said radiation.

4. A chemical laser as set forth in claim 2 wherein said radiator passageways each have hollow metal walls between adjacent passages, said hollow walls being filled with processed radioactive waste.

5. A chemical laser as set forth in claim 2 wherein said passageways contain periodically spaced projections into the passages for impeding gas flow therethrough to enhance radiation affecting gas flowing therethrough.

6. A chemical laser as set forth in claim 1 wherein said radioactive energy exchanger is a radiator comprising a plurality of parallel, passageways, each passageway containing radioactive material disposed therein for affecting inactive gas passing therethrough to provide a rich active gas mixture to said output section, said output section providing mixing of said gas for coupling to said nozzle section.

7. An active atom gas generator comprising: a gas generator chamber having input, intermediate, and output sections, gas dispersion means within said input section, means for supplying inactive gas to said dispersion means for dispersing inactive gas uniformly into said chamber, an energy radiator within said intermediate section of said chamber, said radiator having a plurality of parallel metal passageways to provide passages for gas to pass through the radiator; said passageways each having hollow metal walls between adjacent passages, said hollow walls being filled with processed radioactive waste for radiating energy into the passages for combining with inactive gas passing through said radiator to provide an active atom concentration output from said radiator, and said output section for output coupling the active atom concentration gas output from said radiator.

8. An active atom gas generator comprising: a gas generator chamber having input, intermediate, and output sections; gas dispersion means within said input section, means for supplying inactive gas to said dispersion means for dispersing inactive gas uniformly into said chamber, an energy radiator within said intermediate section of said chamber, said radiator having a plurality of parallel metal passageways to provide passages for gas to pass through the radiator, said passageways containing radioactive material for radiating energy into the passages for combining with inactive gas passing through the radiator to provide an active atom concentration output from said radiator, said passageways containing periodically spaced projections into the passages for impeding gas flow therethrough to enhance radiation affecting gas flowing therethrough, and said output section providing output coupling of the output gas from said radiator.

9. An active atom gas generator as set forth in claim 8 wherein said radiator passageways each have hollow metal walls between adjacent passages, said hollow walls being filled with processed radioactive waste.

* * * * *